United States Patent [19]

Marciandi et al.

[11] Patent Number: 5,385,973
[45] Date of Patent: Jan. 31, 1995

[54] PROCESS FOR PREPARING FLOWABLE, STABLE AND HARDENABLE SUSPENSIONS, AND THUS-OBTAINED COMPOSITIONS

[75] Inventors: Franco Marciandi; Dario Giudici, both of Rho; Marco Binaghi, Milan, all of Italy

[73] Assignee: Vedril S.p.A., Italy

[21] Appl. No.: 169,534

[22] Filed: Dec. 20, 1993

Related U.S. Application Data

[63] Continuation of Ser. No. 963,289, Oct. 19, 1992, abandoned, which is a continuation of Ser. No. 760,832, Sep. 10, 1991, abandoned, which is a continuation of Ser. No. 288,975, Dec. 23, 1988, abandoned.

[30] Foreign Application Priority Data

Dec. 17, 1987 [IT] Italy .................................. 23050 A/87

[51] Int. Cl.$^6$ ............................ C08K 5/54; C08K 5/56
[52] U.S. Cl. ....................... 524/730; 524/853; 525/10; 525/55; 525/242; 525/523; 525/910
[58] Field of Search ................. 524/730, 853; 525/10, 525/55, 242, 523, 910

[56] References Cited

U.S. PATENT DOCUMENTS

| | | | |
|---|---|---|---|
| 3,024,126 | 3/1962 | Brown | 523/212 |
| 4,302,381 | 11/1981 | Omura | 524/853 |
| 4,431,755 | 2/1984 | Weber et al. | 523/216 |
| 4,786,660 | 11/1988 | Ittmann | 524/853 |

FOREIGN PATENT DOCUMENTS

| | | |
|---|---|---|
| 218866 | 4/1987 | European Pat. Off. . |
| 3531913 | 3/1987 | Germany . |
| 1038488 | 5/1975 | Italy . |
| 51-89554 | 8/1976 | Japan ............................. 524/853 |
| 1111603 | 5/1968 | United Kingdom . |
| 1132261 | 10/1968 | United Kingdom . |
| 1140542 | 1/1969 | United Kingdom . |
| 2099000 | 1/1982 | United Kingdom . |

*Primary Examiner*—Melvyn I. Marquis
*Assistant Examiner*—Randy Gulakowski
*Attorney, Agent, or Firm*—Morgan & Finnegan

[57] ABSTRACT

The present invention relates to a process for preparing flowable, stable and hardenable compositions, comprising mixing:
a) a liquid basis constituted by at least one polymerizable monomer;
b) a finely ground mineral filler;
c) a silanizing agent for the mineral filler; and
d) a hydrolysis catalyst of the silanizing agent, selected from the ammonium salts of organic acids.

21 Claims, No Drawings

1

PROCESS FOR PREPARING FLOWABLE, STABLE AND HARDENABLE SUSPENSIONS, AND THUS-OBTAINED COMPOSITIONS

This is a continuation of co-pending application Ser. No. 07/963,289, filed on Oct. 19, 1992, now abandoned, which is a continuation application Ser. No. 07/760,832, filed on Sep. 10, 1991, now abandoned, which is a continuation application Ser. No. 07/288,975, filed Dec. 23, 1988, now abandoned.

FIELD OF THE INVENTION

The present invention relates to a process for preparing flowable, stable and hardenable suspensions, and to the thus-obtained compositions.

BACKGROUND OF THE INVENTION

More particularly, the present invention relates to a process of preparing stable suspensions of mineral fillers in acrylic and/or methacrylic monomers, suitable for bulk polymerization.

It is known that suspensions of mineral fillers in polymerizable liquids, having a high stability over the time necessary before being used in the preparation of finished articles by polymerization, can be obtained by using suitable suspending and viscosity-depressing agents.

In Italian patent No. 1,038,488, flowable, stable and hardenable suspensions based on a polymerizable organic liquid and on a particulated inorganic filler are disclosed, which are obtained in the presence of a copolymeric suspending agent (polymeric dispersant) containing in its chain a component solvatable by the hardenable liquid, and at least one group capable of associating with the mineral filler dispersed in the liquid basis.

To improve the mechanical properties of the finished articles, to the suspension is added a low-molecular-weight coupling agent, generally a silane, which is capable of forming strong chemical bonds with both the liquid basis and the mineral filler.

As an alternative, processes for preparing the above mentioned compositions have been disclosed, wherein as the viscosity depressants only coupling agents, possibly in admixture with surfactants of the anionic, cationic or non-ionic type, are used.

U.K. Patent Nos. 1,111,603; 1,132,261; and 1,140,542 disclose compositions based on alkyl-methacrylic type monomers, which contain high amounts of finely ground mineral fillers pretreated with a coupling agent selected from the organic derivatives of silicon.

According to the disclosures of these patents, a mineral filler, preferably on a siliceous basis, is treated, before being mixed with the polymerizable liquid monomer, with an organic derivative of silicon containing at least one functional group capable of reacting with the surface of the inorganic filler and at least one functional group capable of copolymerizing with the methacrylic monomer.

The functional group reactive with the mineral filler is preferably a hydrolysable group bonded to the silicon atom and which supposedly reacts with the hydroxy groups bonded to the surface of the inorganic material, to form very stable oxygen-bridge bonds.

The thus pre-treated inorganic material is added to the polymerized liquid basis and the obtained composition, to which surfactants are possibly to improve its flowability, results in a composition stable over time, pourable into moulds, and capable of yielding finished articles having good mechanical properties.

In European patent application No. EP-A-218,866 compositions based on esters of acrylic or methacrylic acid are disclosed, which contain a finely ground mineral filler, wherein the silanization of the above described inorganic material takes place in situ when the mineral filler is added to the polymerizable liquid basis.

According to the disclosure of that patent application, there are added to the polymerizable liquid basis an organic compound of silicon, also capable of polymerizing with the acrylic or methacrylic monomer and of reacting with the inorganic filler, and an alkylamine capable of acting as a catalyst for the above said silicon-organic compound.

However, to obtain a composition having good flowability, and therefore suitable for being poured into moulds, the mineral filler should be added to the liquid blend very slowly, in such a way that the viscosity of the obtained composition never exceeds 10 Pa.s.

In German patent application No. 3,531,913, the above mentioned drawback is overcome by adding to the composition an amount of up to 5% by weight of a suitable viscosity-depressing agent, such as soy lecithin.

We have now found that it is possible to prepare stable and flowable (fluid) suspensions of finely ground mineral fillers in a polymerizable liquid, by directly silanizing the inorganic material in situ, but without the drawbacks of the prior art (controlled addition of the mineral filler, or use of soy lecithin), by using particularly efficacious silanization catalysts.

DETAILED DESCRIPTION OF THE INVENTION

The present invention provides a process for preparing flowable, stable and hardenable suspensions, comprising mixing:
a) a liquid basis, constituted by at least one polymerizable monomer;
b) a finely ground mineral filler;
c) a silanizing agent for the mineral filler; and
d) a hydrolysis catalyst for the silanizing agent, selected from the ammonium salts of organic acids.

The polymerizable monomer is preferably selected from the alkyl esters of acrylic or methacrylic acid, wherein the alkyl group contains from 1 to 6 carbon atoms. Examples of such esters are methyl methacrylate (MMA), ethyl methacrylate, propyl methacrylate, butyl methacrylate, methyl acrylate, ethyl acrylate, butyl acrylate, and so forth.

Furthermore, as polymerizable monomers, vinylic monomers such as styrene, alpha-methyl-styrene, acrylonitrile, etc., can be used.

Methyl methacrylate, either alone, or mixed with up to 50% by weight of the above-said monomers, is particularly preferred.

Mineral fillers suitable for use in the process of the present invention are inorganic substances having hydrophilic surfaces characterized by the presence of polar groups, preferably hydroxyl groups, which can react with the silanizing agent or form a hydrogen bridge with the siloxanic groups. Examples of suitable fillers are amorphous or crystalline silica (quartz, cristobalite, etc.), glass, alumina, aluminium trihydroxide, calcium carbonate, mineral silicates, aluminosilicates (mica, talc, wollastonite, etc.), mineral oxides, such as $Fe_2O_3$, $TiO_2$, $Cr_2O_3$, etc., asbestos, fibreglass, and so forth.

The mineral fillers are finely ground both to obtain adequate aesthetic and mechanical properties in the finished articles and to obtain a proper stability of the suspension.

The particles of the filler should preferably have granular or spheroidal shape; however for particular applications, particles having a different shape, e.g. needle-like, as in case of use of fibreglass, can be used as well.

For particular applications, mixtures of particles of granular or spheroidal shape with particles of needle-like shape can be used.

The average particle diameter is generally from 0.1 to 50 micrometers, and preferably from 1 to 20 micrometers. The surface area is generally from 0.5 to 10 m²/g, preferably from 2 to 7 m²/g.

The silanizing agent is an organic derivative of silicon containing hydrolysable groups, and is selected from those having general formula:

$$R_1ZR_2Si(OR)_3$$

wherein:

$R_1$ represents a hydrogen atom, an either saturated or unsaturated alkyl, cycloalkyl, or alkylaryl radical or an aryl radical containing from 1 to 20 carbon atoms, optionally substituted with hydroxy, mercapto, amino, epoxy, optionally esterified or amidated carboxyl groups, or a saturated or unsaturated acyl radical containing from 2 to 20 carbon atoms;

Z represents a direct bond or a bivalent radical selected from —O—, —NH—, —S—, —CH$_2$—, and so forth;

$R_2$ represents a direct bond or an alkylenic, arylenic, optionally alkyl-substituted radical, containing from 1 to 20 carbon atoms;

R represents an alkyl, aryl, alkyl-aryl radical containing from 1 to 20 carbon atoms, optionally substituted with alkoxy, alkylamino or alkylmercapto groups, wherein the alkyl group contains from 1 to 12 carbon atoms.

Examples of usable silanes are methyltriethoxysilane, methyltrimethoxysilane, vinyltriethoxysilane, gamma-methacryloxypropyltrimethoxysilane, gamma-methacryloxyloxypropyltris(2-methoxyethoxy)silane, gamma-glycidoxypropyltrimethoxysilane, gamma-mercaptopropyltriethoxysilane, gamma-aminopropyltriethoxysilane, and N-beta(aminoethyl)gamma-amino-propyl-trimethoxysilane, and so forth.

The catalyst of silane hydroylsis is preferably selected from the ammonium salts of organic acids having general formula:

$$R_4COO^-/NR_5R_6R_7R_8/^+$$

wherein:

$R_4$ represents a hydrogen atom or an optionally unsaturated alkyl, cycloalkyl, or alkylaryl radical or an aryl radical containing from 1 to 20 carbon atoms, and $R_5$, $R_6$, $R_7$, $R_8$, which may be the same as or different from each other, may be hydrogen, or alkyl or cycloalkyl radicals containing from 1 to 20 carbon atoms.

Examples of catalysts are isopropylammonium acetate, isopropylammonium methacrylate, ammonium oleate, ammonium stearate, ammonium methacrylate, n-propylammonium methacrylate, dimethylammonium butyrate, isopropylammonium oleate, isopropylammonium benzoate, and ethylammonium acrylate, and so forth.

The catalyst can be prepared by means of the direct addition of the organic acid to ammonia or to the amine; such a reaction can be carried out separately, or directly in situ in the composition.

According to a preferred embodiment of the present invention, to the suspensions there may be also added surface-active agents soluble in the monomer, and with a high enough affinity for the mineral filler. In general, the use of surfactants containing ethoxy or propoxy groups, such as ethoxylated alkylphenols, sulphonate agents, alkyl sulphates, alkylammonium phosphates and phosphonates, wherein the alkyl group contains up to 20 carbon atoms, and phosphoric esters, etc., is advisable.

Examples of surfactants are ethoxylate nonylphenol containing from 1 to 15 molecules of ethylene oxide, ethoxylated octylphenol containing from 1 to 15 molecules of ethylene oxide, ammonium dodecylbenzenesulphonate, sodium 2-ethylhexylsulphosuccinate, double sulphate of ammonium and ethoxylated lauryl alcohol with 1–3 ethylene oxide molecules, ($C_4C_{12}$)-alcohol phosphates, acid phosphates of stearamidopropyl-dimethyl-β-hydroxyethylammonium, and so forth.

The amount of surfactant is preferably from 0 to 0.5% by weight, more preferably from 0.05 to 0.20% by weight, based on the total mass.

The amount of mineral filler to be used in the compositions of the present invention depends on the desired characteristics of the end articles and on the characteristics of flowability of the suspension.

In general, the use of high percentages of fillers, from 30 to 80% by weight based on the total, is preferred. As an example, in the case of siliceous fillers, it is better to work with concentrations higher than 50% by weight. Correspondingly, percentages of from 70 to 20% by weight of the polymerizable monomer, or monomer mixture, are generally used.

The silane is preferably used at concentrations from 0.01 to 2%, more preferably from 0.05 to 0.1%, by weight, based on the filler.

The catalyst is preferably used at concentrations from 0.01 to 1%, more preferably from 0.01 to 0.5%, by weight, based on the total composition.

Besides the above listed compounds, to the suspensions other compounds may be possibly added, such as:

1) mono-, or bi-, or polyfunctional monomers soluble in the main monomer and copolymerizable with it, e.g. ethyleneglycol dimethacrylate, triethyleneglycol dimethacrylate, tetraethyleneglycol dimethacrylate, pentaerythritol tetraacrylate, divinylbenzene, and so forth, the amounts thereof being from 0 to 2% by weight, based on the total composition;

2) pigments and/or inorganic and/or organic dyes, the amounts thereof being from 0 to 5% by weight based on the total composition;

3) mould-release agents, antistatic agents, plasticizers, anti-U.V. agents, antioxidants, polymerization inhibitors, etc., in amount from 0 to 2% by weight, based on the total composition.

The stable suspensions of the present invention can be prepared within short times and at room temperature, have a low viscosity which depends on the filler content and granulometry, but which is generally from 0.01 to 0.3 Pa.s, and are easily redispersable after a long storage.

The viscosity of the suspension can be furthermore increased, and adjusted at an optimum level for injection moulding or for bulk polymerization by means of the addition of well-known viscosity modifiers, such as methacrylic or vinylic homo- and/or copolymers.

To obtain considerable viscosity changes with a small addition of the modifier, high-molecular-weight modifiers are advantageously used.

Polymers or copolymers having an average molecular weight (Mw) comprised within the range of from 20,000 to 1,000,000, more preferably of from 50,000 to 500,000, are the most commonly used ones.

Examples of polymers to be used as viscosity modifiers are polymethylmethacrylate, methylmethacrylatemethylacrylate copolymers, methylmethacrylate-styrene copolymers, methylmethacrylate-butylacrylate copolymers, polyethylmethacrylate, methylmethacrylate-methacryloxypropyltrimethoxysilane copolymers, polystyrene, poly-alpha-methylstyrene, and so forth.

The amount of the polymeric modifier to be used also depends, partially, on the molecular weight thereof. In general, additions of up to 20% by weight based on the monomer, more preferably of from 0.05 to 10%, are advisable.

The manner of carrying out the process of the present invention is of a conventional type; e.g., a ball mill can be used, the reactants being charged all at once, or at successive times, the mill being kept running until fluidization occurs.

According to a different technique, the suspensions can be obtained by loading the components into a reactor, then submitting them to a slow stirring, and subsequently to a fast stirring, until fluidization occurs.

The transformation into finished articles of the compositions of the present invention can take place by moulding under a pressure of from 1 to 4 atmospheres, and at a temperature from 70° to 100° C. in case of sealed moulds, an amount of a peroxidic catalyst (e.g. benzoylperoxide or tert-butylcyclohexylperoxycarbonate) being preliminarily added, in an amount from 0.1 to 2%, preferably 0.2 to 0.7%, by weight, and with the possible preliminary addition of mould-release agents, such as stearic acid, glycerol monostearate, and so forth.

Before being moulded, the suspension is advantageously deaerated, by being submitted to a reduced pressure under stirring.

By using milder polymerization conditions and proper thermal cycles, the suspension can be polymerized by means of techniques similar to those used for manufacturing cast methacrylic sheets, or for preparing articles according to roto-moulding technology.

The invention in another aspect provides a flowable, stable and hardenable composition, comprising:

a) a liquid basis constituted by at least one polymerizable monomer;
b) a finely ground mineral filler;
c) a silanizing agent for the mineral filler; and
d) a hydrolysis catalyst for the silanizing agent, selected from the ammonium salts of organic acids.

According to a preferred method of carrying out the process of the invention, there are effected the following steps.

1. There is charged into a ball mill the mineral filler (e.g. cristobalite) and a methyl methacrylate/methyl acrylate (98:2) copolymer such as that sold under the Trade-Name VEDRIL.

2. There is charged into the mill a liquid component, comprising the polymerizable monomer, preferably methyl methacrylate; a polymerization inhibitor, such as that sold under the Trade-Name TOPANOL; and a curing agent, such as tetraethyleneglycoldimethacrylate.

3. There is charged into the mill a silane, such as gamma-methacryloxypropyl-trimethoxysilane.

4. The mill is rotated overnight, for about 18 hours, to obtain a viscous paste.

5. There is added to the resulting paste, in the mill, a catalyst, such as isopropyl ammonium oleate; and a coloring component, suitably comprising a pigment (such as $TiO_2$), an organic liquid carrier (dibutyl phthalate) and a small amount of a conventional non-ionic surfactant (a polyethoxylated nonyl phenol containing on average 9 mols of ethylene oxide per mol).

6. The mill is rotated to complete the reaction, during about 6 hours, to obtain the final product.

EXAMPLES

The invention will be further described with reference to the following illustrative Examples.

EXAMPLE 1

Into a 5 liter porcelain mill, containing ceramic balls of 30 mm diameter for a total actual volume of 1.2 liter, were charged 615 g of methylmethacrylate (MMA) containing 200 ppm of Topanol A (2,4-dimethyl-6-tert.-butylphenol) as the inhibitor; 6 g of ethyleneglycol dimethacrylate; 21 g of gamma-methacryloxypropyl-trimethoxysilane; 5 g of isopropylammonium oleate; and 1500 g of cristobalitic silica having an average granulometry of approximately 6 micrometers and a surface area of 3.5 $m^2/g$.

The mill was revolved for 5 hours at a revolution speed of approximately 25 rpm. and the obtained suspension had a viscosity of 0.038 Pa.s, 70 g of $TiO_2$-based dyeing paste (80% by weight of $TiO_2$, 15% by weight of dibutyl phthalate, 5% by weight of nonylphenol ethoxylated with 9 mol of ethyleneoxide) and 45 g of MMA-ethyl acrylate copolymer (98/2 ratio by weight, average molecular weight 100,000) were added in the mill to 2,000 g of the above suspension.

The mill was allowed to revolve for a further 6 hours, and was then discharged. The suspension was a flowing fluid, with a viscosity of 0.25 Pa.s. (as measured by Brookfield Viscometer LVT4, rotor No. 2) at the discharge point, and of 0.17 Pa.s. after 24-hour standing.

The viscosity of the suspension was measured again after a 3-month storage at room temperature. For such purpose, the suspension was homogenized again by tumbling the container for approximately 6 hours; the viscosity was found to be equal to the original value (0.15 Pa.s).

To the suspension were added 0.6% by weight of Perkadox 16 (bis-4-tert.-butylcyclohexylperoxydicarbonate), and 0.15% of stearic acid, the suspension was stirred up to complete solution and homogenization, and deaerated under reduced pressure for 10 minutes and poured between two crystal plates.

The resulting sandwich was plunged into a water bath at 85° C. for 30 minutes, to carry out the polymerization.

A polymerized slab of 200 $cm^2$, and of 3 mm thickness, was obtained, with glossy surface and free from cracks or other faults. From the slab, specimens were obtained for the evaluation of the mechanical and physical characteristics. The results were the following.

| Test | Method | Results |
|---|---|---|
| Specific Gravity | — | 1.8 Kg/dm$^3$ |
| Rockwell Surface Hardness-B Scale | ASTM D 785 | 98 |
| Flexural modulus | ASTM D 790 | 16.880 MN/m$^2$ |
| Mechanics of Fracture on Pendulum (Kic) | — | 1.6 MN/m$^{3/2}$ |
| Gloss at 85° | ASTM D 523 | 96% |
| White Index | — | amber 84.9 |
|  |  | blue 85.0 |
|  |  | green 85.5 |

The White Index was measured by a Photovolt Model 60 type apparatus manufactured by Photovolt, with ultra-pure magnesium oxide being used as the reference.

The method adopted for measuring Kic according to the Mechanics of Fracture on Pendulum was based on principles applied in the evaluation of the tenacity of composite materials (ASTM STP 410—William F. Brown Jr. and John E. Srawly 1966, page 13). The evaluation technique was so set up, as to measure the tenacity at high speed of the test, under extremely critical conditions of notch sharpness, such as can occur in manufactured articles in correspondence of faults.

The test were carried out on specimens 3 mm in thickness (B), 6 mm in width (W) and 60 mm in length.

The depth of the sharp notch (a), realized with a normal razor-blade, was 2.5 mm, and the distance from the supports was 48 mm. The thus-obtained specimens were submitted to an impact at a speed of 0.5 m/second.

The Kic values were computed on the basis of the equation:

$$Kic = Y o C a$$

wherein a is the depth of the notch, Y is the geometric factor (ASTM STP 410) and $$oC = 3/2 Fr.s$$

(s=distance between the supports; Fr=break point).

EXAMPLE 2

To the mill of Example 1 were charged 650 g of MMA containing 200 ppm of Topanol A; 12 g of ethyleneglycol dimethacrylate; 48 g of gamma-methacryloxypropyltrimethoxysilane; 2.38 g of isopropylammonium methacrylate; and 1.680 g of cristobalitic silica, having the same characteristics as of that of Example 1.

The mill was revolved for 1 hour at a speed of approximately 25 rpm and the obtained suspension had a viscosity of 0.05 Pa.s.

For comparative purposes, a similar suspension was prepared, but without the ammonium salt; after 5 hours of tumbling, the composition had a viscosity higher than 10 Pa.s. with a thixotropic behaviour. After a further 3 hours, the suspension has a viscosity of 0.45 Pa.s. which dropped to 0.12 Pa.s after 24 hours of tumbling.

EXAMPLE 3

To the mill of Example 1 were charged 650 g of MMA stabilized with 200 ppm of Topanol A; 15 g of tetraethyleneglycoldimethacrylate; 4.6 g of gamma-methacryloxypropyltrimethoxysilane; 40 g of MMA-methyl acrylate copolymer, with a weight ratio of 98/2 and average molecular weight 100,000; and 1,700 g of cristobalitic silica.

The mill was tumbled for 10 hours, and then to the mixture were added 10 g of methylmethacrylate; 80 g of TiO$_2$ paste having the same characteristics as reported in Example 1; and 2.5 g of isopropylammonium methacrylate. After 4 hours of tumbling, the viscosity of the suspension was 0.3 Pa.s.

EXAMPLE 4

The test were run according to the same manner as described in Example 3, except that the ammonium salt was prepared in situ, by adding 1.5 g of methacrylic acid and 1.029 g of isopropylamine.

The end viscosity, after 4 hours of tumbling, was 0.3 Pa.s.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A process for preparing a stable, fluid and hardenable composition, consisting essentially of mixing:
   a) at least one liquid polymerizable monomer selected from vinylic monomers and C$_1$-C$_6$ alkyl esters of acrylic or methacrylic acid;
   b) a finely ground mineral filler in the amount of from 30 to 80% based upon the total composition;
   c) a silanizing agent for the mineral filler; and
   d) a hydrolysis catalyst of the silanizing agent selected from the ammonium salts of organic acids.

2. A process as claimed in claim 1, wherein the polymerizable monomer is selected from methyl methacrylate, ethyl methacrylate, propyl methacrylate, butyl methacrylate, methyl acrylate, ethyl acrylate, and butyl acrylate.

3. A process as claimed in any of claims 1, wherein the polymerizable monomer is methyl methacrylate, either alone or admixed with up to 50% by weight of one or more other monomers selected from vinylic monomers and C$_1$-C$_6$ alkyl esters of acrylic or methacrylic acid.

4. A process as claimed in claim 1, wherein the polymerizable monomer is a vinylic monomer selected from styrene, alpha-methyl-styrene, or acrylonitrile.

5. A process as claimed in claim 1, wherein the mineral filler is at least one inorganic substance having a hydrophilic surface containing polar groups capable of reacting with the silanizing agent, or of forming hydrogen bridges with siloxanic groups and having particle diameter from 0.1 to 50 micrometers and a surface area from 0.5 to 10 m$^2$/g.

6. A process as claimed in claim 5, wherein the mineral filler has particle diameter from 1 to 20 micrometers and a surface area from 2 to 7 m$^2$/g.

7. A process as claimed in claim 5 or 6, wherein the mineral filler is selected from one or more amorphous or crystalline silica, glass, alumina, aluminium trihydroxide, calcium carbonate, mineral silicates, mineral oxides, and fiberglass.

8. A process as claimed in claim 1, wherein the silanizing agent is an organic derivative of silicon containing hydrolysable groups, and is selected from those having general formula:

$R_1ZR_2Si(OR)_3$ wherein:
R₁ represents a hydrogen atom, an unsubstituted or substituted saturated or unsaturated alkyl, unsubstituted or substituted cycloalkyl or alkylaryl radical, or an unsubstituted or substituted contain aryl radical wherein said radicals, where appropriate, from 1 to 20 carbon atoms, said substituents being selected from with hydroxy, mercapto, amino, epoxy, carboxyl and esterified or amidated carboxyl groups, or a saturated or unsaturated acyl radical containing from 2 to 20 carbon atoms;

Z represents a direct bond or a bivalent radical preferably selected from —O—, —NH—, —S—, —CH₂—;

R₂ represents a direct bond, an alkylenic or arylenic radical, or an alkyl-substituted alkylenic or arylenic radical containing where appropriate, from 1 to 20 carbon atoms;

R represents an alkyl, aryl, or alkyl-aryl radical, said radicals, where appropriate, containing from 1 to 20 carbon atoms, and said substituents being selected from alkoxy, alkylamino or alkylmercapto groups, wherein the alkyl group of the alkxy, alkylamino or alkylmercapto groups contains from 1 to 12 carbon atoms.

9. A process as claimed in claim 8, wherein the silanizing agent is selected from methyltriethoxysilane, methyltrimethoxysilane, vinyltriethoxysilane, gamma-methacryloxypropyltrimethoxysilane, gamma-methacryloxypropyltris (2-methoxyethoxy)silane, gamma-glycidoxypropyltrimethoxysilane, gamma-mercaptopropyltriethoxysilane, gamma-aminopropyltriethoxysilane, and N-beta (aminoethyl) gamma-amino-propyl-trimethoxysilane.

10. A process as claimed in claim 1, wherein the silanizing agent is used at a concentration from 0.01 to 2% by weight based on the loaded material.

11. A process as claimed in claim 1, wherein the catalyst for silane hydrolysis is selected from the ammonium salts of organic acids having general formula:

$R_4COO^-[NR_5R_6R_7R_8]^+$ wherein:
R₄ represents a hydrogen atom or an unsaturated or saturated alkyl, cycloalkyl, or alkylaryl radical, or an aryl radical said radicals containing, where appropriate from 1 to 20 carbon atoms, and R₅, R₆, R₇, R₈, which may be the same as or different from each other, may be hydrogen, or alkyl or cycloalkyl radicals, said radicals containing, where appropriate, from 1 to 20 carbon atoms.

12. A process as claimed in claim 1, wherein the amount of catalyst is from 0.01 to 1% by weight based on the total composition.

13. A process as claimed in claim 1, wherein a surface-active agent containing ethoxy or propoxy groups is added to the composition.

14. A process as claimed in claim 13, wherein the surface-active agent is selected from ethoxylated alkylphenols, sulphonated agents, alkyl sulphates, alkylammonium phosphates and phosphonates, and phosphoric esters.

15. A process as claimed in claim 1, wherein the amount of surface-active agent is from 0 to 0.5% by weight based on the total mass.

16. A process as claimed in claim 1, wherein the silanizing agent is used at a concentration preferably from 0.05 to 1% by weight based on the loaded material.

17. A process as claimed in claim 1, wherein the amount of catalyst is preferably from 0.01 to 0.5% by weight based on the total composition.

18. A process as claimed in claim 15, wherein the amount of surface-active agent is from 0.05 to 0.2% by weight based on the total mass.

19. A stable, fluid and hardenable composition, consisting essentially of mixing:
a) at least one liquid polymerizable monomer selected from vinylic monomers and C₁–C₆ alkyl esters of acrylic or methacrylic acid;
b) a finely ground mineral filler in the amount of from 30 to 80% based upon the total composition;
c) a silanizing agent for the mineral filler; and
d) a hydrolysis catalyst for the silanizing agent, selected from the ammonium salts of organic acids.

20. A composition as claimed in claim 19, having a viscosity from 0.01 to 0.3 Pa.s measured at room temperature.

21. A process for preparing a stable, fluid and hardenable composition, consisting essentially of mixing:
a) at least one liquid polymerizable monomer selected from vinylic monomers and C₁–C₆ alkyl esters of acrylic or methacrylic acid;
b) a finely ground mineral filler in the amount of from 30 to 80% based upon the total composition;
c) a silanizing agent for the mineral filler; and
d) a hydrolysis catalyst for the silanizing agent selected from the group consisting of isopropylammonium acetate, isopropylammonium methacrylate, ammonium oleate, ammonium stearate, ammonium methacrylate, n-propylammonium methacrylate, dimethylammonium butyrate, isopropylammonium oleate, diisopropylammonium benzoate, and ethylammonium acrylate.

* * * * *